United States Patent Office
3,450,110
Patented June 17, 1969

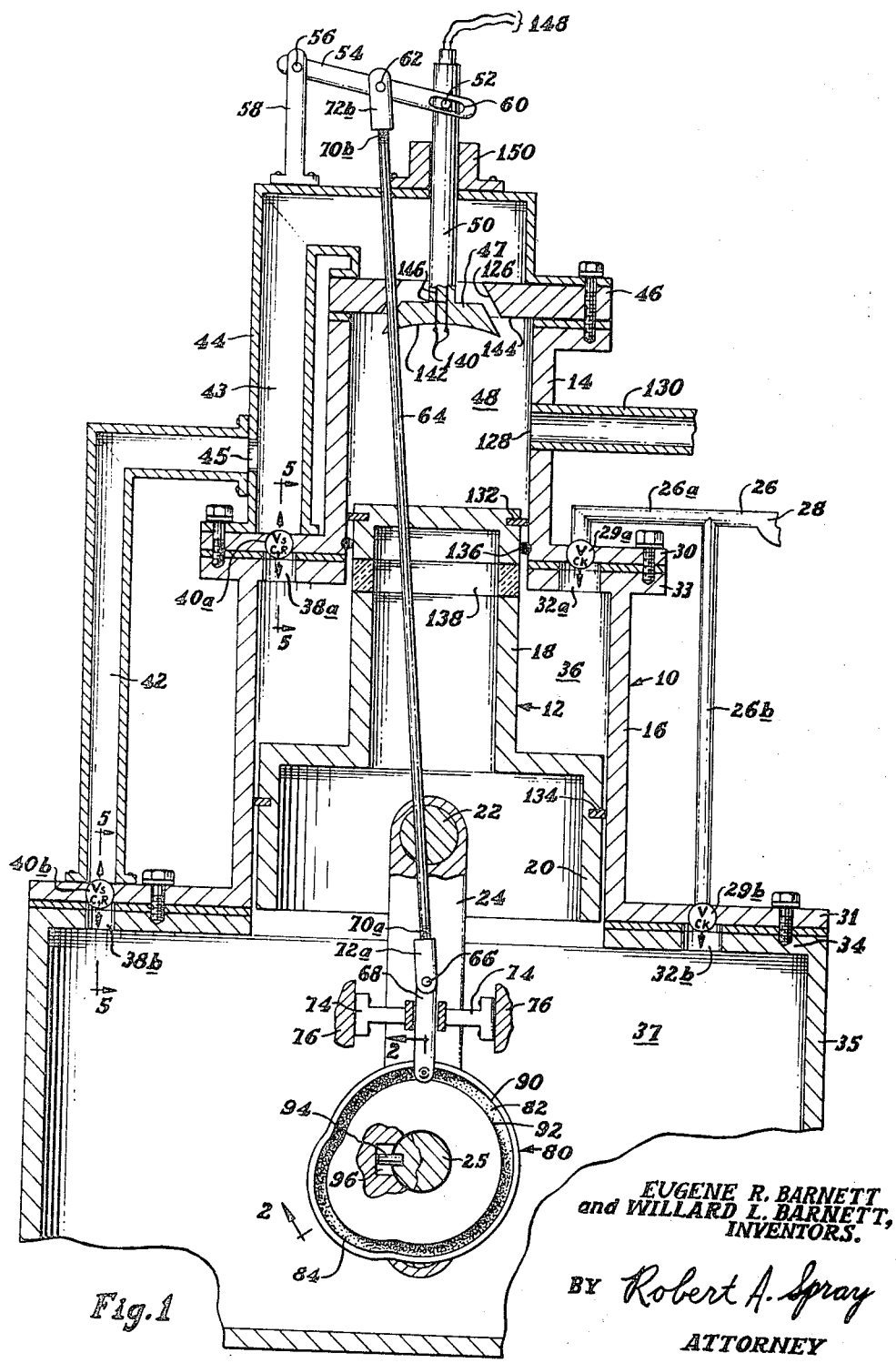

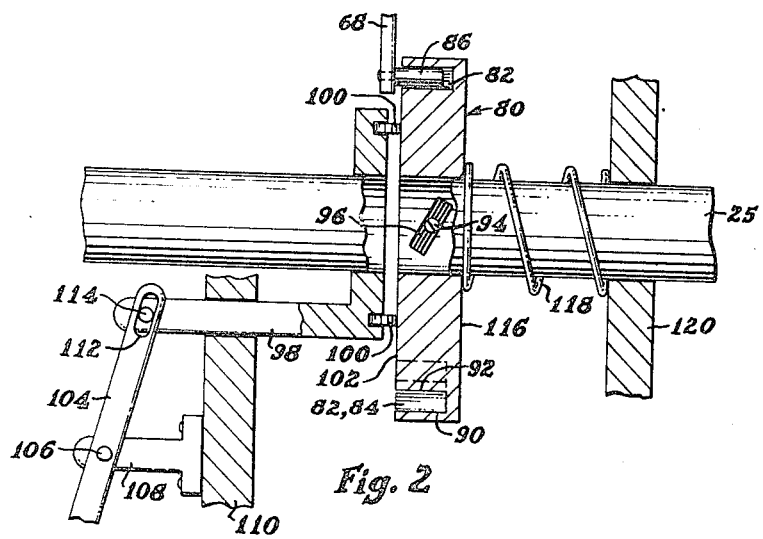
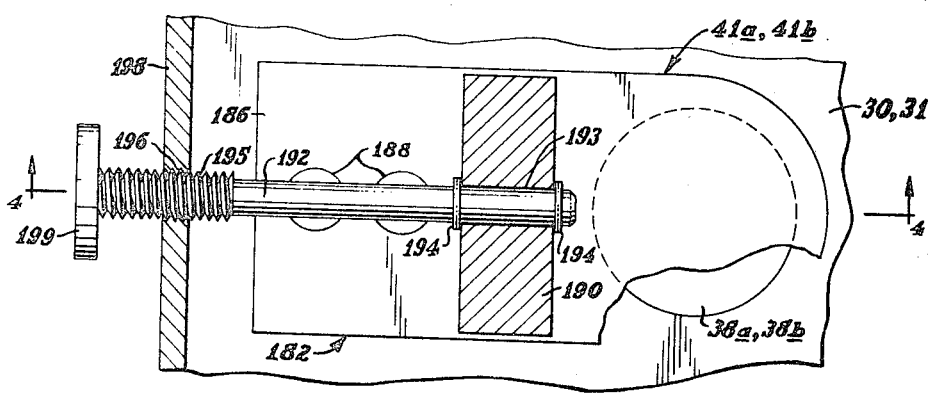
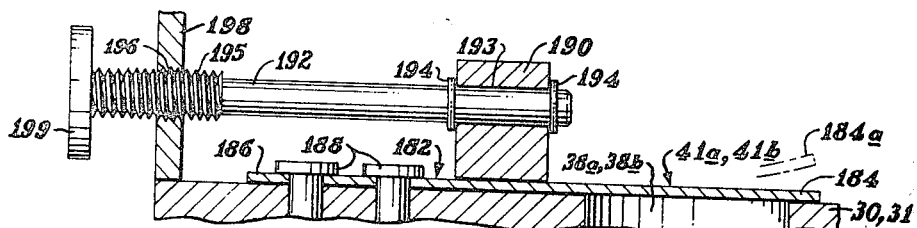
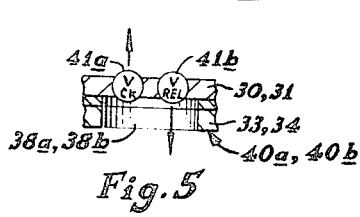

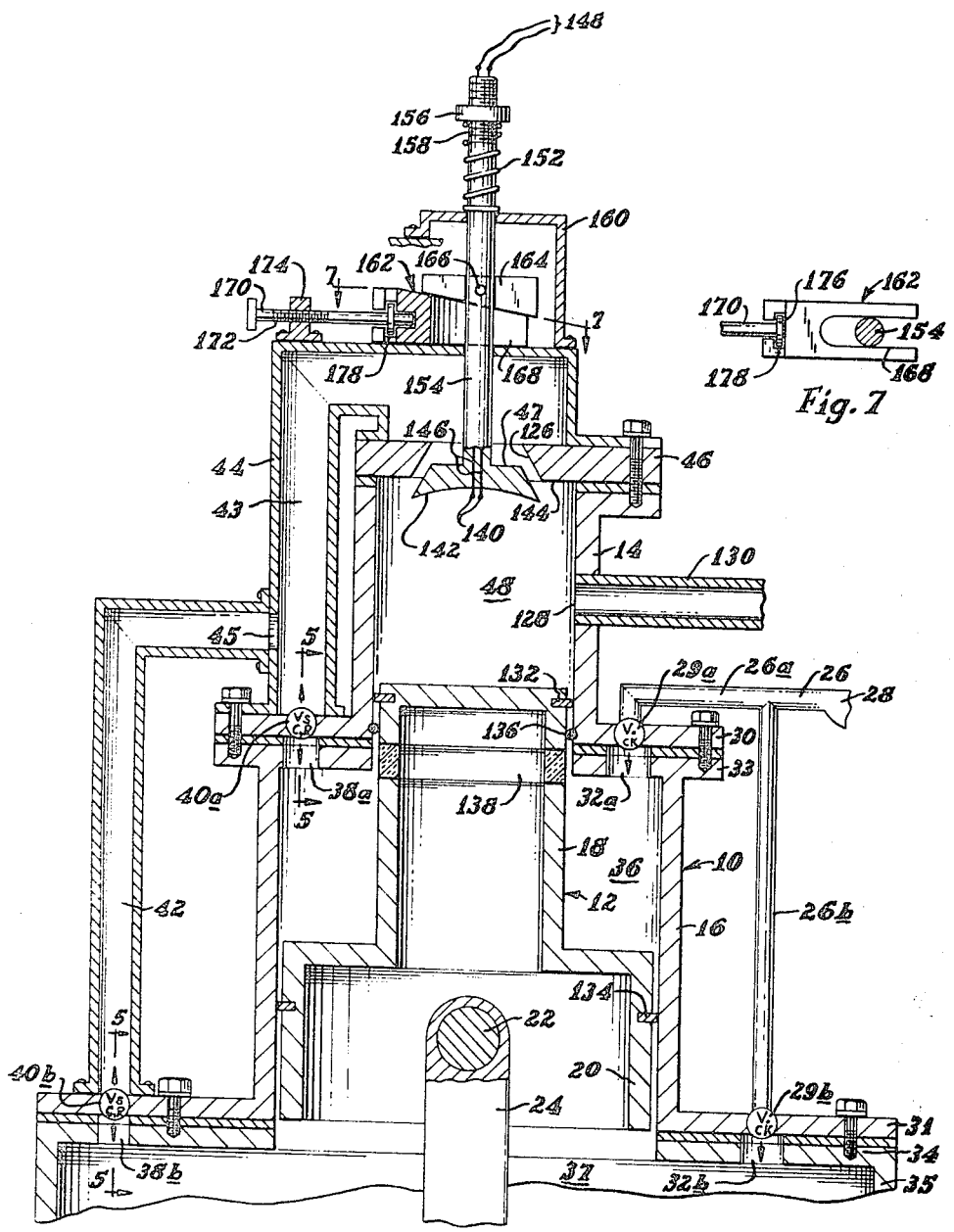

3,450,110
POWER UNIT
Eugene R. Barnett, 6268 Windsor Drive 46219, and Willard L. Barnett, 3367 W. Michigan St. 46222, both of Indianapolis, Ind.
Continuation-in-part of application Ser. No. 566,357, July 19, 1966. This application Oct. 16, 1967, Ser. No. 675,698
Int. Cl. F02b 33/10
U.S. Cl. 123—71                     6 Claims

ABSTRACT OF THE DISCLOSURE

A stepped or double piston engine means having means providing double-acting character. Co-operating features also include means for regulating the fuel-air valve, which means attains a relative rotation with respect to the crankshaft by a relative axial movement with respect thereto; means for regulating the same said valve by adjustably regulating the length of valve-opening travel; and an adjustable reed valve means in the fuel-air supply. All of the said co-operating features are adjustable while the engine is operating.

---

This application relates to a power unit of an internal combustion engine, and is a continuation-in-part of applicants' co-pending United States patent application S.N. 566,357, filed July 19, 1966, entitled "Power Unit," now U.S. Patent No. 3,404,665. It is, moreover, somewhat similar to applicants' United States Patent No. 3,166,055.

More particularly, the inventive concepts of the present invention are illustrated in conjunction with engines of stepped-piston nature, having supercharged two-cycle principle.

In contrast to the aforesaid application and patent, concepts of the engine of the present application provide that its fuel-air intake is of double-acting nature; and provide a regulation of valve-timing while the engine is operating, by a novel valve-camming mechanism providing adjustment of valve-timing with respect to piston-cycling. Other concepts provide adjustable valves of reed type, giving desired adjustability of fuel-air supply. Concepts provide adjustability also of valve-actuation and valve-travel, and provide also novel means for adjustable regulation of pre-ignition combustion-chamber compression.

The various adjustments are achievable by the present inventive concepts, while the engine is operating, thus achieving ease of control for increasing power, effectiveness, and improving other operating characteristics at various speeds and other engine situations.

The above description is introductory and generalized; and the above and other objects, features, concepts, and advantages, which co-operate to provide the novel and advantageous overall invention, will further appear from the following detailed description of illustrative embodiments of the invention, reference being had to the accompanying somewhat schematic and diagrammatic drawings, in which:

FIG. 1 is a cross-sectional view of an engine embodying the invention according to a first embodiment;

FIG. 2 is a detail cross-sectional view thereof, in enlarged scale, taken generally as indicated by Section-line 2—2 of FIG. 1;

FIG. 3 is a detail view, in substantially enlarged scale, of an adjustable valve utilized in the embodiments shown in FIGS. 1 and 6;

FIG. 4 is a cross-sectional view of the valve shown in FIG. 3, this view being taken generally as indicated by Section-line 4—4 of FIG. 3;

FIG. 5 is a detail view, taken generally as indicated by View-lines 5—5 of FIGS. 1 and 6;

FIG. 6 is a cross-sectional view of the upper portion of an engine according to a second embodiment of the invention; and FIG. 7 is a detail view taken generally as shown by Section-line 7—7 of FIG. 6.

As shown in the drawings, an engine or power means according to the embodiment illustrated in FIG. 1 generally comprises a cylinder 10 and a piston 12 reciprocable therein. The cylinder 10 is shown as having stepped configuration, providing a relatively smaller-diameter upper portion 14 and a relatively larger-diameter lower portion 16, the cylinder-portions being adjacent and concentrically aligned but axially spaced.

The pistons 12 is likewise shown as of stepped configuration, providing a relatively smaller-diameter upper portion 18, and a relatively larger-diameter lower portion 20. The piston 12 is shown in bottom dead-center position, and is shown as including a piston pin 22 and a connecting rod 24, by which power is transmitted to a crank-shaft 25.

As will now be described, the upper cylinder 14 provides a "power" cylinder; and the lower cylinder 16 provides a double-acting "supply" cylinder.

Fuel-air charge, with lubricating oil also if desired, is admitted to the cylinder-portion 16 from a fuel-delivery tube 26 (having a suitable carburetor or other charge-nature adjustment-means indicated at 28) by a branch intake line 26a leading to the upper end of the supply cylinder 16, and another branch intake line 26b leading to the lower end of the supply cylinder 16. As shown, the intake branch 26a leads to a downwardly-opening check valve 29a shown located in a lower flange 30 of the upper cylinder 14; and the lower intake branch 26b leads to a downwardly-opening check valve 29b, which is shown as located in a lower flange 31 of the supply cylinder 16. The fuel-air charge, after passing the valves 29a and 29b, respectively, passes through an opening respectively identified as 32a and 32b, respectively located in the wall 33, which provides the cylinder head for the supply cylinder 16, and in the upper wall 34 of the crank-case 35. The valves 29a and 29b are desirably of reed type.

Double-acting fuel-air supply is achieved as follows: During down-stroke of the piston 12, fuel-air is drawn through the valve 29a into the annular supply zone 36 which exists exteriorly of the upper piston-portion 18 and interiorly of the cylinder-portion 16; while on the up-stroke of the piston 12, fuel-air is drawn through the valve 29b into the interior 37 of the crank-case 35. Thus, both down-stroke and up-stroke of the piston 12 achieve a drawing of fuel-air into one of the supply regions 36 or 37; and, as will be shown, the succeeding half-stroke will effect a delivery of fuel-air from the respective supply zone.

During up-stroke of the piston 12, the larger piston-portion 20 forces fuel-air upwardly through an opening 38a in the wall 33 of the lower cylinder 16, and upwardly through a valve 40a located in the flange 30 of the upper cylinder-portion 14. Similarly, during down-stroke of piston 12, the larger piston-portion 20 applies a pressure to the fuel-air charge in the crank-case interior 37, forcing it through an opening 38b in the upper crank-case wall 34 and through a valve 40b in the flange 31 of the cylinder-portion 16. The crank-case 35 is in effect a part of the supply cylinder.

The valve assemblies 40, which are illustrated in greater detail in FIGS. 3, 4, and 5, each include both a check valve 41a and a relief valve 41b, the check valve 41a opening upwardly and the relief valve 41b opening downwardly, as indicated. Both the check valve 41a and the relief valve 41b are desirably of reed type, and are shown in FIGS. 3 and 4 as being adjustable, as will be more fully described here and after.

A conduit 42 is shown as mounted on the flange 31, communicating the valve 40b with a conduit 43 which is mounted on the flange 30 in communication with the valve 40a, the conduit 43 being also a storage zone for fuel-air. The conduit or storage zone 43 is provided by a housing 44 which extends upwardly along the exterior of the upper cylinder-portion 14, providing a passage for the fuel-air and also over the cylinder-head 46 of the upper cylinder-portion 14. A valve 47, details and operation of which are now to be described, regulates the communication of the storage zone 43 with the combustion chamber 48 which exists interiorly of the upper or power cylinder 14.

An important feature of the present invention are means for changing the timing of the operation of the valve 47, while the engine is operating; and this feature will be described in conjunction with the operation of the valve 47.

The valve 47 is carried on a valve stem 50, which is pinned as by a pin 52 to a link 54 pivoted as at 56 to a bracket member 58. The link 54 is shown as provided with an elongated slot 60, to receive the valve stem pin 52 in a manner which permits rotation movement of the link 54 and axial movement of the valve stem 50.

For actuating the movement of the link 54, and thus actuating the valve stem 50 and its valve 47, the link 54 is pinned as by a pin 62, to a control rod 64, the other end of which is shown pinned as at 66 to a reciprocable link 68. (Actuation of link 68 is described below, in connection with the timing-adjustment feature.)

Adjustability of the link or rod 64 is shown by its ends being oppositely threaded as at 70a and 70b so that the overall length of the rod 64 and its end-pieces 72a and 72b may be easily varied by twisting the rod 64, suitable jam nuts (not shown) or the like being provided to maintain the desired setting; and a bracket 74 is shown as guiding the link 68 for reciprocable movement, the bracket 74 being mounted on convenient framing 76.

The valve-timing adjustment means, as shown in FIGS. 1 and 2, includes a cam 80 shown of disk type, whose groove or race 82 has a lobe-portion 84. The cam 80 is shown to be of positive-return type, that is, the motion of the cam-follower roller 86 of the link 68 is forced by both the outer (inwardly-facing) wall 90 and the inner (outwardly-facing) wall 92 of the cam-groove 82.

The cam 80 is mounted upon a shaft whose movement is co-ordinated with the cycling of the engine-piston 12, and as shown is mounted upon the crank-shaft 25 itself.

The valve-timing adjustment of the mounting of cam 80 is shown as by the cam 80 being both slidable and rotatable with respect to the crank-shaft 25; and the axial position and the relative rotational position of the cam 80 is adjustably settable by a pin 94, which extends radially outwardly from the crank-shaft 25 and which extends into a slot 96 in the cam 80. The slot 96 is formed at an angle other than ninety degrees to the axis of the shaft 25 and cam 80.

Axial movement of the cam 80 thus causes it to be cammed rotationally by the walls of slot 96 engaging pin 94; and the axial movement of the cam 80 with respect to the shaft 25 is shown as provided by a control yoke or slidable bracket 98 having rollers 100 which engage the face 102 of cam 80.

Axial movement of the bracket 98 is provided by a control rod 104 (shown pinned as at 106 to a mounting bracket 108 mounted on framing 110) having an elongated slot 112 which receives a pin 114 of the movable bracket member 98.

The face 116 of cam 80 opposite its face 102 bottoms a compression spring 118 which surrounds the crank-shaft 25, the other end of the spring 118 being bottomed against framing shown as the wall 120. (One or both of the walls 110 and 120 may be a crank-case wall if desired, the drawings being only schematic of the operational features in this respect; and suitable collars, spacers, and the like may be used as desired.)

Timing-adjustment of the valve 47 and its control rod 64 is thus seen to be achievable, while the engine is operating, by rotating the control rod 104, which, as just described, effects an axial and thus also a rotational movement of cam 80, varying the rotational position of the cam-lobe 84 with respect to the crank-shaft 25, and thus varying the timing relationship of the operation of valve 47 with respect to the cycling of the engine piston 12. The relative rotational relationship of the cam 80 and crank-shaft 25 is thus seen to correspond to the relative axial relationship of those members, and a change of one such relationship thus changes the other relationship correspondingly and as an incident thereof; and those relationships are controlled by the members 104 and 118 which, together with their associated components, co-operate to provide controllable abutment means achieving the controlled relationship of the cam 80 and its mounting shaft 25.

(If no adjustability of valve-timing is desired during engine-operation, the cam 80 may be fixed as by a set-screw or other fixing means (not shown) preferably of adjustable type, and the adjustment-providing parts such as the control bracket 98 and its operating rod 104 omitted.)

The open position of the valve 47 permits fuel-air to flow from the storage or supply region 43 into the combustion chamber 48 through the opening 126 provided by the seat of the valve 47. Upon ignition (by means described below) of the charge of fuel-air in the combustion chamber 48, the explosion force acts upon the head of piston-portion 18 to drive the piston 12 downwardly, achieving the power stroke of the engine, and the exhaust gases pass outwardly of the combustion chamber 48 through the exhaust port 128 which communicates a lower portion of the power cylinder 14 with an exhaust pipe 130.

Scavenging is achieved during the initial portion of the piston upstroke, the location of the exhaust port 128 being above the head of piston-portion 18 when it is in bottom dead-center position.

Piston rings 132 and 134 are shown as respectively carried by the upper piston-portion 18 and the lower piston-portion 20; and an O-ring 136 is shown as carried by the upper cylinder-portion 14 adjacent its lower end, bearing against the smaller piston-portion 18, effecting a sealing operativity.

An intermediate body-member 138 of insulating material is provided as a part of the upper piston-portion 18, reducing conduction of heat downwardly from the combustion chamber 48 through upper piston-portion 18. Desirably, the overall heat is also reduced by a suitable water-jacket, which desirably extends over both the power cylinder 14 and the supply cylinder 16.

The ignition means is shown as provided by electrodes 140 carried by the valve 47, the lower face 142 of the valve 47 being shown of downwardly-concave formation or nature, permitting the electrodes 140 to be disposed above the lower face 144 of the cylinder head 46 when the valve 47 is in closed position.

The electrodes 140 are supplied with electric energy by a circuit 146 which is carried in the valve stem 50, internally thereof as shown; and the circuit 146 is electrically powered by a flexible electric circuit 148 supplied with electric power in a suitably controlled manner as by a distributor (not shown).

The dished concavity or relief of the valve-face 142, and the spark electrodes being on the valve 47, permit the valve to be of larger diameter than in other engines, for the need of cylinder-head space for a separate spark-plug or other ignition device is avoided; and the larger valve-circumference provides greater effective valve-passing passage-area for the fuel-air charge. Moreover, the high location of the electrodes 140 during valve-closure permits the head of the power-piston 18 to come closer to the cylinder head 46, achieving higher compression ratios.

A retainer member 150 is shown mounted upon the upper wall of the housing 44, for guiding the valve stem 50 for its axial travel.

The FIG. 6 embodiment of the invention, now to be described, is shown as quite similar in all respects to the FIG. 1 embodiment, except as to valve-actuation and valve-stroke adjustability of the valve 47; and thus, for brevity of description, the FIG. 1 and FIG. 6 correspondency of parts is indicated by correspondency of reference numerals on the drawings rather than by again describing all those parts in this written description.

(The numbers referring to those corresponding parts or features of FIGS. 1 and FIG. 6 are 10, 12, 14, 16, 18, 20, 22, 24, 26, 26a, 26b, 28, 29a, 29b, 30, 31, 32a, 32b, 33, 34, 35, 36, 37, 38a, 38b, 40a, 40b, 42, 43, 44, 45, 46, 47, 48, 128, 130, 132, 134, 136, 138, 140, 142, 144, and 146, as well as the parts shown in FIGS. 3, 4, and 5 including the adjustable valve assemblies generally designated by reference numerals 41a and 41b.)

As shown in FIG. 6, opening-actuation of the valve 47 is by the pressure of fuel-air in supply chamber 43 acting downwardly on the valve 47, against the pressure in combustion chamber 48 and also against the valve-closing bias of a compression spring 152 which surrounds the stem 154 of valve 47.

The spring-bias of spring 152 is adjustable, as shown, by having its upper end bottom against an adjustable nut-member 156 which is threaded upon threads 158 shown provided on the upper portion of the valve stem 154. The other end of spring 152 bottoms against a bracket 160 shown mounted on the housing 44.

Valve stroke-length adjustability is shown by a horizontally-movable wedge 162 which engages an associated wedge 164 connected as by a pin 166 to the valve-stem 154. As shown in FIG. 7, the wedge 162 is provided with an open central portion 168 which receives the valve-stem 154 and which permits the wedge 162 to move with respect thereto.

Adjustment of the wdege 162 is shown by a control shaft 170, whose threads 172 threadedly engage a bracket 174 shown mounted on the housing 44; and the control shaft 170 has an abutment 176 which is located in an associated recess 178 of the wedge 162.

The valve 47 of FIG. 6 is thus seen to be caused to be opened during the initial and subsequent portions of upstroke of piston 12 by the pressure in supply chamber 43 (against valve-closing pressure in the combustion chamber 48 and against valve-closing bias of the spring 152); but, near the top of the upstroke of the piston 12, the pressure in the combustion chamber 43 is sufficient (port 128 being closed) that closure of valve 47 is effected by the combined effect of pressure in combustion chamber 48 and the valve-closing bias of spring 152.

The adjustment of nut 156 is thus seen to control the time of valve-closure; and the wedge-members 162 and 164 are seen to control the amount of valve-travel, more specifically, the location of the valve 47 in its lowest or most-open position. In some engines, the amount of valve-travel affects the duration of valve-opening; and thus regulating the amount of valve-travel, as by the abutment blocks 164 and 168, is operative to affect the duration of valve-opening.

FIGS. 3 and 4 illustrate adjustable reed valves 41a and 41b of each of the valve assemblies 40a and 40b. As there shown, a flexible valve sheet 182 has a valving portion 184, which overlies the opening 38a or 38b, and a supporting portion 186 which is shown as secured to the plate 30 or 31 by rivets 188. The valve is upwardly-opening, as viewed in FIG. 4, the valve sheet 184 being flexibly movable to a valve-open position shown by the chain-line showing 184a.

Adjustability of the valves 41a or 41b is shown by an abutment block 190 which engages the valve sheet 182, between the rivets 188 and the valve-opening 38a, 38b, effectively to adjustably reduce the unsupported length and thus the flexibility-character of the valve sheet 182 between the gas pressure-area of valve-sheet portion 184 and the supporting rivets 188; and the position and thus also the sheet-stiffening effect of the block 190 is controlled by an adjustment shaft 192 which is shown as axially fixed but rotatably secured to the block 190, by passing through a hole 193 on the block 190 and carrying snap-rings 194 or the like which engage the block 190. Threads 195 on shaft 192 threadedly engage mating threads 169 of a convenient wall 198; and a control knob 199 on the free end of control shaft 192 provides convenience of its manipulation to achieve the desired setting.

It will be understood that calibrations or other suitable setting-markings will be provided for the control knobs 199, as well as other control members such as the control rod 104 (FIG. 2) control nut 156 (FIG. 6) and control shaft 170 (FIG. 6).

Thus, it is seen that advantages are obtained by the novel concepts of the present invention, singly and in combination, including: adjustability of valve-timing (cam 80 and its adjustment on mounting shaft 25); adjustable fuel-air flow (reed valves 41a, 41b); double-acting nature of fuel-air intake (29a, 29a); adjustment of valve-travel (162, 164) and valve-actuation (152, 156). All those adjustments may be advantageously achieved while the engine is operating.

Accordingly, it will thus be seen from the foregoing description of the invention according to these illustrative embodiments, considered with the accompanying drawings, that the present invention provides a new and useful power means, having desired advantages and characteristics, and accomplishing its intended objects, including those hereinbefore pointed out and others which are inherent in the invention.

Modifications and variations may be effected without departing from the scope of the novel concepts of the present invention; accordingly, the invention is not limited to the specific form or arrangement of parts herein described or shown.

Moreover, terms and expressions of the description and claims are to be broadly construed. For example, the term "fuel-air" is to be interpreted to refer to any component or components of the combustible charge, here contemplating both fuel-air mixtures as by a carburetor, or fuel injection types; and the terms like "head," "top," "upstroke," and the like are used to avoid repetition of alternatives, and it is not implied that the engine invention is limited to the upright vertical arrangement shown.

What is claimed is:

1. An engine means of double piston nature having a power piston movable in a power cylinder and a supply piston movable in a supply cylinder, and having a fuel-air delivering means for delivering fuel-air to said power cylinder, in a combination in which means are provided for admitting fuel-air operatively to both sides of said supply piston to thereby provide double-acting character of fuel-air supply, in which:

during a first stroke of said supply piston in a first direction fuel-air is admitted to a first side of said supply piston and is forced from the other side of said supply piston toward said fuel-air delivering means, and during a second stroke of said supply piston in a second direction fuel-air is admitted to said other side of said supply piston and is forced from said first side of said supply piston toward said fuel-air delivering means;

there being an enclosure wall means within which said supply piston operatively moves in its said strokes;

there being a pair of fuel-air inlets in said wall means, and respectively located therein in positions such that fuel-air may pass therethrough throughout at least substantially the entire travel of said supply piston in its said first and second strokes respectively.

2. The invention as set forth in claim 1, in a combination in which the engine crankcase provides an enclosure which, together with the movable supply piston, provides a chamber of varying size, and into which fuel-air is admitted, to effect one of the said fuel-air supply operativity.

3. The invention as set forth in claim 1, in a combination in which the actuation of the fuel-air-intake valve of the said power cylinder, which admits fuel-air thereinto from said fuel-air delivering means, is controlled by pressure of fuel-air in said fuel-air delivering means.

4. The invention as set forth in claim 1 in a combination in which there are provided first and second rotational members, and means interconnecting the two, said means including co-operating abutments carried respectively by the two;

said abutments operatively engaging one another, and formed to provide that as the said first and second rotational members are moved relatively axially of one another the interengaging abutment means correspondingly change the relative rotational relationship of the two members as an incident to changing the said relative axial location thereof, in a combination in which means are provided for maintaining a desired relative axial relationship of the two and thus maintaining correspondingly a desired rotational relationship of the two members.

5. The invention as set forth in claim 1 in a combination in which the fuel-air delivering means includes a valve, means being provided for regulating the length of travel of said valve, comprising:

a first abutment member carried by the said valve;

a second abutment member which engages said first abutment member to limit valve travel;

the said second abutment member being movably supported for movement along a path such that it will operatively engage said first abutment member in a selected one of a plurality of positions to limit the valve travel as desired;

there being provided means for operatively moving said second abutment member along said path while the said power cylinder and said valve are operating, thereby providing that the valve-stroke is regulatable while the engine is operating;

the valve-opening duration being at least in part dependent upon the length of valve travel, thus the regulation of valve travel also being operative to affect the duration of valve-opening.

6. The invention as set forth in claim 1 in a combination in which, for regulating flow of the fuel-air of said fuel-air delivering means, there is provided a reed valve means including a wall member having a flow-opening therein, and a flexible sheet member secured to said wall member at a location spaced from said opening and having a valve-means portion valvingly overlying said opening;

an abutment block engaging the said sheet member between its said location of securement to the wall member and the said opening, thereby effectively adjustable reducing the unsupported length and thus the flexibility-character of the sheet member;

there being provided a movable control means for moving the said abutment block to selectively vary its location and thereby vary the flexibility-character of the sheet member to vary the operating characteristic of the said valve means.

References Cited

UNITED STATES PATENTS

| 796,686 | 8/1905 | Westendarp. |
| 1,161,128 | 11/1915 | Herr. |
| 1,313,578 | 8/1919 | Burchett. |
| 1,396,371 | 8/1921 | Johnson. |
| 1,652,930 | 12/1927 | Crary. |
| 1,722,201 | 7/1929 | Crary. |
| 1,771,552 | 7/1930 | Tower. |

FOREIGN PATENTS 491,138   2/1930   Germany.

WENDELL E. BURNS, Primary Examiner.

U.S. Cl. X.R.

123—65, 74

UNITED STATES PATENT OFFICE
CERTIFICATE OF CORRECTION

Patent No. 3,450,110

June 17, 1969

Eugene R. Barnett et al.

It is certified that error appears in the above identified patent and that said Letters Patent are hereby corrected as shown below:

Column 6, line 27, "29a", second occurrence, should read -- 29b --.

Signed and sealed this 14th day of April 1970.

(SEAL)
Attest:

Edward M. Fletcher, Jr.
Attesting Officer

WILLIAM E. SCHUYLER, JR.
Commissioner of Patents